(12) United States Patent
Terlizzi et al.

(10) Patent No.: US 7,331,526 B2
(45) Date of Patent: Feb. 19, 2008

(54) BATTERY PACK WITH INTEGRATED HUMAN INTERFACE DEVICES

(75) Inventors: Jeff Terlizzi, Sound Beach, NY (US); Alex Breytman, Bellmore, NY (US); Jorg Schlieffers, Setauket, NY (US); Kevin Cordes, Miller Place, NY (US); Jean Tu, Stony Brook, NY (US); Jay Paul White, Bohemia, NY (US); Chin-Hung Jwo, Mount Sinai, NY (US); David Tsi Shi, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 11/556,975

(22) Filed: Nov. 6, 2006

(65) Prior Publication Data
US 2007/0057069 A1    Mar. 15, 2007

Related U.S. Application Data

(63) Continuation of application No. 10/317,495, filed on Dec. 12, 2002, now Pat. No. 7,140,546.

(51) Int. Cl.
*G06K 7/10*    (2006.01)

(52) U.S. Cl. ............................ 235/472.01; 235/462.01; 235/486

(58) Field of Classification Search ............ 235/472.01, 235/486, 462.01, 462.44, 462.45, 462.46; 307/66, 150; 320/132, 118
See application file for complete search history.

(56) References Cited

U.S. PATENT DOCUMENTS

| 6,051,957 | A  | * | 4/2000 | Klein ......................... 320/132 |
| 6,777,910 | B2 | * | 8/2004 | Small ......................... 320/106 |
| 7,164,257 | B2 | * | 1/2007 | Johnson et al. ............. 320/134 |
| 2002/0079867 | A1 | * | 6/2002 | Sakakibara et al. ......... 320/152 |

* cited by examiner

*Primary Examiner*—Ahshik Kim
(74) *Attorney, Agent, or Firm*—Amin, Turocy & Calvin, LLP

(57) ABSTRACT

A power pack with human interface devices that includes a power pack housing, which is detachably interfaced to a portable device. The power pack includes a power source internal to the housing for providing power, a light source internal to the housing for producing a light signal associated with a status, which light signal is viewable external to the housing, and an audio source internal to the housing for producing an audio signal associated with the status. The power pack interfaces electrically to the portable device to provide power thereto, and receive therefrom control signals associated with the status, which control signals activate at least one of the light source and audio source according to the status.

20 Claims, 5 Drawing Sheets

BATTERY PACK WITH INTEGRATED HUMAN INTERFACE DEVICES

CROSS-REFERENCE TO RELATED APPLICATIONS

This application claims the benefit of U.S. patent application Ser. No. 10/317,495, filed Dec. 12, 2002, now U.S. Pat. No. 7,140,546, entitled "BATTERY PACK WITH INTEGRATED HUMAN INTERFACE DEVICES," the entirety of which is incorporated herein by reference.

TECHNICAL FIELD

This invention is related to battery packs for portable devices.

BACKGROUND OF THE INVENTION

The wearable computer market is rapidly expanding, and could grow even faster, if technology advances continue and consumers embrace these "fashionable" productivity tools. Two major wearable computer (or portable data collection devices) form factors are belt/head-worn products that typically come equipped with a head-mounted display and headset microphone and/or tablet display, and wrist/finger-worn devices, that are usually associated with a bar code scanner and a voice or touchscreen interface.

Such portable data collection devices are widely used in manufacturing, service, and package delivery industries to perform a variety of on-site data collection activities, including integrated bar code dataform readers adapted to read bar code dataforms affixed to products, product packaging and/or containers in warehouses, retail stores, shipping terminals, etc., for inventory control, tracking, production control and expediting, quality assurance and a wide variety of other purposes.

A portable finger-worn scanning device called a "ring" scanner enhances data capture in environments by extending data collection capabilities beyond traditional parcel and baggage processing, warehouse order picking and inventory applications to grab data at any point of activity, e.g., indoor and outdoor environments such as scanning lift tickets at a ski slope, ticket scanning for concert and event admittance . . . .

The wearables market could be larger still, however, should additional technical hurdles common to such small collection devices be overcome. Such point-of-activity applications are more demanding in that the scanning device must not only be small, but the unit electronics must be sealed against the most extreme weather conditions. Additionally, to ensure that bar codes and other dataforms can and are scanned successfully from different angles, the operator is provided feedback in the form of visual and/or audible signals.

For example, ergonomic, mechanical, and electrical concerns need to be addressed in the ring scanner. Ergonomic concerns revolve around the mechanical design of the placement of the light source (e.g., LEDs) for visual feedback to the user, and the audio transducer could not be located in an ideal area to be heard. Mechanical concerns include sealing of the collection device to ratings sufficient to protect the electronics and the user. Such stringent requirements would make housing of an effectively loud audio transducer extremely difficult due to watertight sealing concerns. Electrical concerns include the overall physical volume of the audio transducer that is many times greater than any other typical components used in such a design. Consequently, it becomes even more problematic for the user to perceive device operation via audible and visual indicators from the scanner housing, and the designer to incorporate such indicators in the scanner housing.

Thus, there remains a need for a portable data collection device of a reduced form factor that can successfully scan dataforms yet provide device operation indicators and alerts perceivable to the user.

SUMMARY OF THE INVENTION

The present invention provides for a reduced form-factor portable data collection device. A power pack in accordance with the subject invention includes a housing, which is detachably interfaced to the portable device. The power pack includes a power source internal to the housing for providing power, a light source internal to the housing for producing a light signal associated with a status, which light signal is viewable external to the housing, and an audio source internal to the housing for producing an audio signal associated with the status. The power pack interfaces electrically to the portable device to provide power thereto, and receive therefrom control signals associated with the status, which control signals activate at least one of the light source and audio source according to the status.

In another aspect thereof, there is provided a portable data collection device, the device comprising a case having at least one portal. The case includes a reading apparatus for reading a readable dataform through the portal, a control circuit for controlling the reading apparatus and processing data representative of the dataform, and a communication interface for communicating the data from the portable device. The device also includes a power pack for providing power to the portable device, the power pack interfacing electrically to the portable device to provide power thereto, and receive from the control circuit control signals associated with a status. The power pack includes a power pack housing, which housing is detachably interfaced to the case of the portable device, a power source internal to the housing for providing power, a light source internal to the housing for producing a light signal associated with the status, which light signal is viewable external to the housing, and an audio source internal to the housing for producing an audio signal associated with the status.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
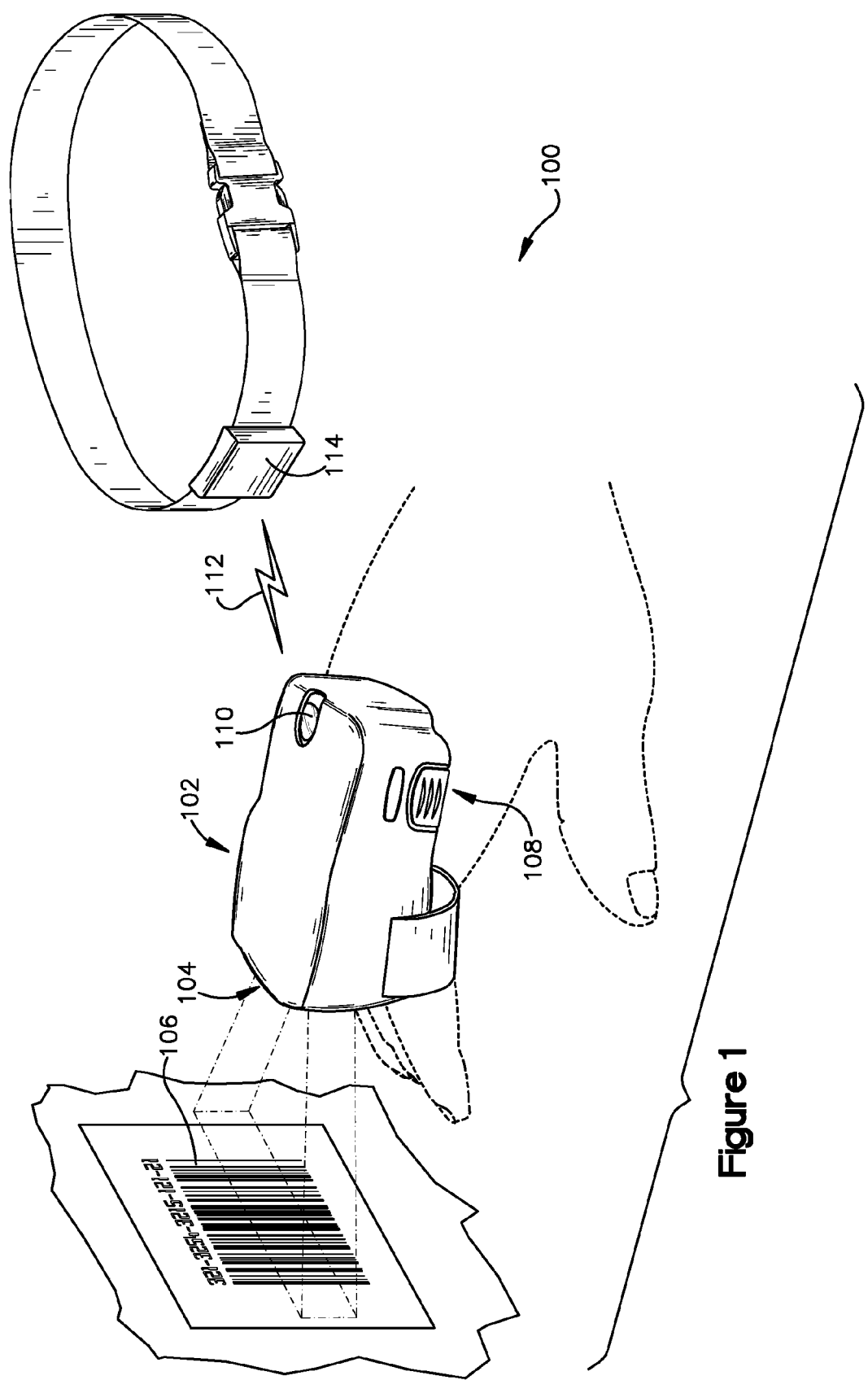
FIG. 1 illustrates a diagram of a general system application incorporating the disclosed battery pack.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

The disclosed invention overcomes the ergonomic, mechanical, and electrical deficiencies in a portable data collection device, e.g., a ring scanner, by designing a battery pack with human interface devices. By including the audio transducer with the battery pack, not only can the size of the electronics in the scanner device be minimized, but also the audio transducer can be easily modified or changed as per different customer requirements (e.g., different battery packs for different customers). Similarly, placement of the LEDs in the battery pack facilitates convenient and efficient visual feedback to the operator.

Referring initially to FIG. 1, there is illustrated a diagram of a general system application incorporating the disclosed battery pack. In this particular embodiment, the system 100 includes a wearable and portable data collection device 102 (hereinafter called a "ring" scanner). The ring scanner 102 is strapped onto one or more fingers of a user, here the index and middle fingers, and oriented such that a scanning portal 104 through which scanning head electronics (or reading apparatus) faces away from the user and toward a readable dataform 106 (hereinafter called a bar code). The scanning head electronics (not shown) scans the readable dataform 106 through the portal 104.

The ring scanner 102 comprises a battery pack 108 (illustrated and described in greater detail hereinbelow) that includes a view port 110 through which the user can view a light emitted from an internal light source. The light source comprises a pair of LEDs (Light Emitting Diodes), one green in color and the other red in color, each associated with a particular status of the scanning operation. It is to be appreciated that any suitable color scheme may be employed in connection with the diodes or light source(s), and moreover any suitable number of light source(s) may be employed in connection with the subject invention. The user will perceive the green light through the view port 110 of the battery pack 108 when a successful scan has occurred. Alternatively, if the scan is unsuccessful, the user will perceive the red light through the view port 110. The controlled confirmations provided by the LEDs and audio transducer can be activated in various combinations or singularly, at the discretion of the operator. For example, normal operation produces a steady green light, while a successful read maintains the green light, and additionally activates a high beep in combination therewith. An unsuccessful read operation could then cause deactivation of the green light, activation of the red light, and activation of the audio transducer to a produce a low beep. Obviously, both LEDs could be off during normal operation to provide the most efficient power savings, while either a successful/unsuccessful read produces activation of only the green/red LED. Furthermore, pulsing of the LEDs to produce more complex flashed alerting schemes can be utilized along with more tonal frequencies. An independent series of same frequency tones or a combination of multi-frequency tones can be used to indicate a different status of either the read operation, or transmit operation, or virtually any operation to which a signal or status is to be associated. Of course, in more robust implementations, more LEDs can be utilized to provide corresponding functions. Additionally, the LEDs need not be separate devices, but can be a multi-color LED device in a single case (e.g., a red/green/blue device or bi-color red/green device), or a flasher LED that includes a built-in chip for controlling a flashing function according to the corresponding status. However, since the power source is from batteries, the light source preferably would be suitable for low power consumption.

The battery pack 108 also includes an audio source that emits an audio signal corresponding to the scan status. If the scan was successful, the audio source is controlled to emit a high-pitched beep or tone. Alternatively, if the scan was unsuccessful, the audio source is controlled to emit a lower-pitched tone or beep. The audio signal is controlled to be emitted in conjunction with the light signal such that the user receives feedback from two signal sources to ensure that the scan operation is conducted properly. That is, the higher-pitched beep is sounded in conjunction with the green color to indicate a successful scan, and lower-pitched beep with the red color to indicate an unsuccessful scan.

Once the dataform 106 has been scanned, data representative of the scanned dataform is communicated wirelessly over a wireless communication link 112 to a remote data collection unit 114. The remote collection unit 114 can be attached to a belt of the user such that the remote unit 114 and ring scanner 102 are in operative communication with one another.

The ring scanner 102 is automatically triggered to read the dataform 106 when brought in close predetermined proximity thereto. An alternative embodiment provides a thumb switch positioned along the index finger, between the index finger and thumb, such that the switch can be conveniently and manually activated when the user wants the scan operation to be performed.

Figure 2:
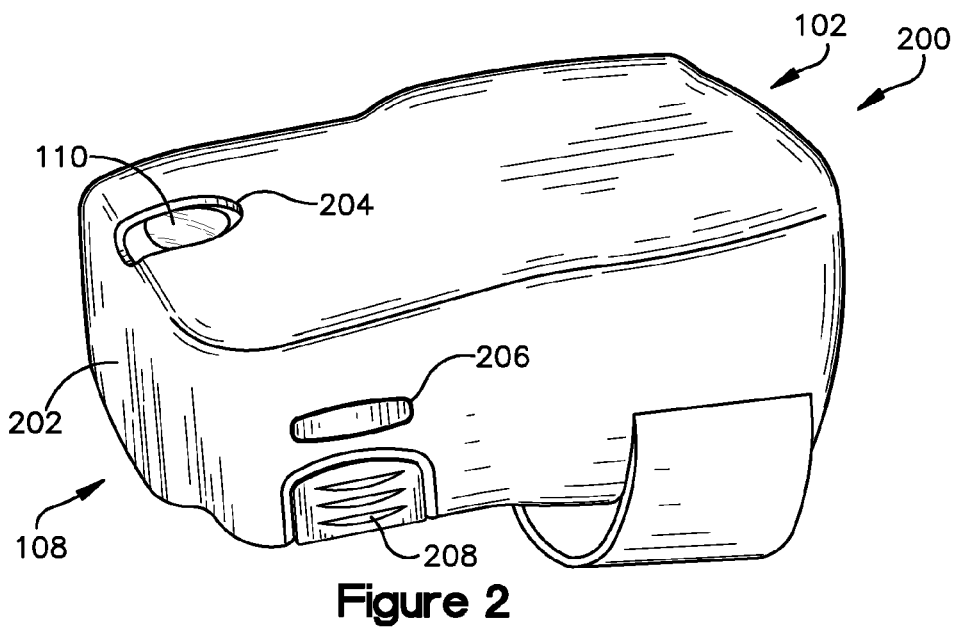
FIG. 2 illustrates a rear view isometric of the ring scanner of FIG. 1.

Referring now to FIG. 2, there is illustrated a rear view isometric 200 of the ring scanner 102 of FIG. 1. The scanner 102 comprises a case 202 that encases all of the electronics required to perform the scanning and communication operations. Since the scanner 102 can be utilized in a wide variety of applications and environments, the case 202 is designed to be sealed according to IP-64 of the DIN 40 050/IEC 529 standards. The case 202 also is suitably designed to receive the battery pack 108. To facilitate viewing of the light source from the battery pack 108, the case 202 includes a view port hole 204 in which the view port 110 is aligned to allow the user to perceive the light emitted from the light sources internal to the battery pack 108. The case 202 also includes latch openings 206 on either side of the case 202 for accommodating compressible latches 208 on either side of the battery pack 108, for engaging the corresponding latch openings 206 from underneath the case 202 to secure the battery pack 108 within a case 202. The scanner 102 also includes strap 210 for strapping the scanner 102 onto the backside of the two fingers.

Figure 3:
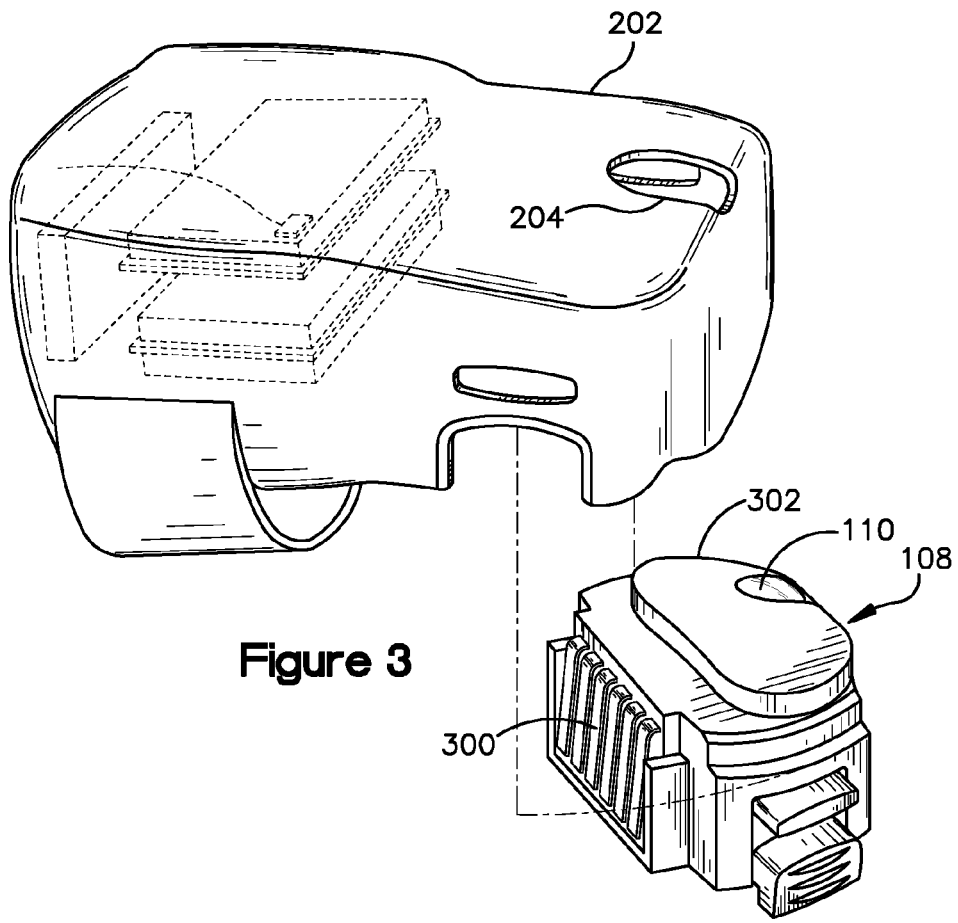
FIG. 3 illustrates an isometric of the battery pack disengaged from the scanner case.

Referring now to FIG. 3, there is illustrated an isometric of the battery pack 108 disengaged from the scanner case 202. The battery pack 108 engages the scanner case 202 from underneath, and is position to the rear of the case 202 so that the user perceives both the light and audio signals from the rear of the scanner 102 during operation. The battery pack 108 includes an interface connector 300 for electrically interfacing the pack power and circuits to the electronics internal to the scanner case 202. The battery pack 108 includes the view port 110 which is one end of a focal lens positioned in close proximity to the light sources to substantially focus the emitted light from the light source(s) to viewable lens surface at the outside of a housing 302 of the pack 108. This ensures that the user will see a distinctly colored light according to the respective scan status.

Figure 4:
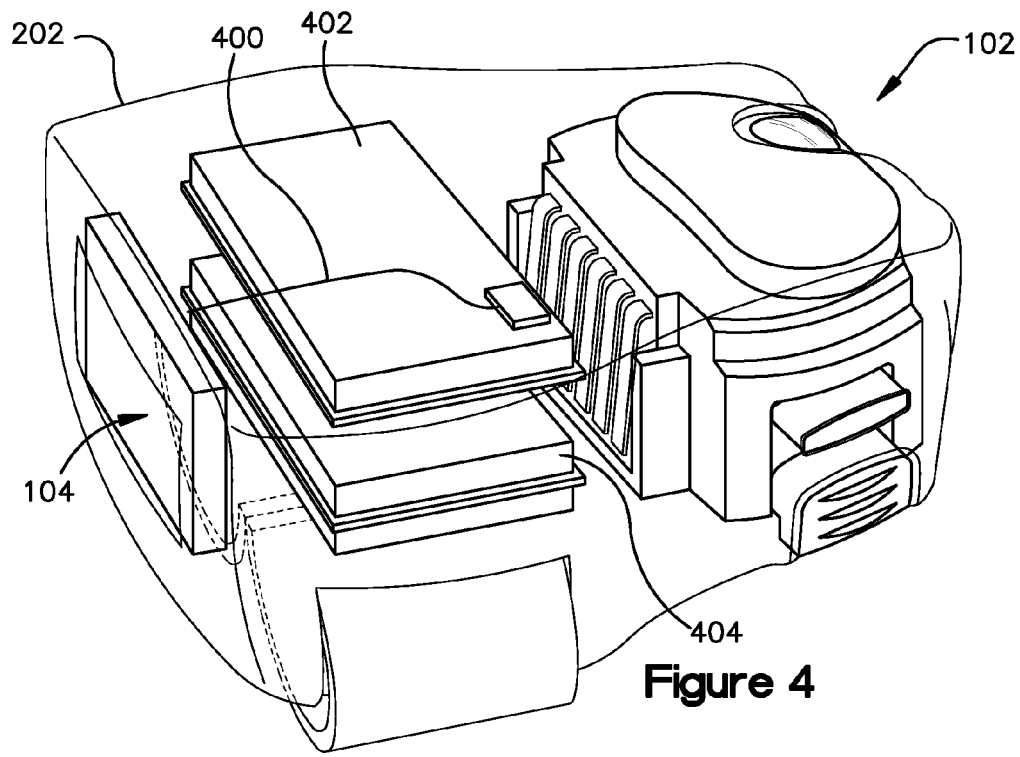
FIG. 4 illustrates a mechanical isometric of the scanner and battery pack.

Referring now to FIG. 4, there is illustrated a mechanical isometric of the scanner 102 and battery pack 108. Internal to the case 202 is the scanning and communication electronics. The scanner 202 communicates wirelessly to the remote collection unit 114 utilizing an antenna 400. The antenna 400 interfaces to a first internal circuit board 402 to connect to a transceiver circuit to facilitate transmission of data and control signals therebetween. Additional electronics are incorporated on a second circuit board 404. Interstitial to the first and second boards (402 and 404) is the reading apparatus (or scan head electronics, and associated optics, if any) for scanning the dataform 106 from through the portal 104.

Figure 5:
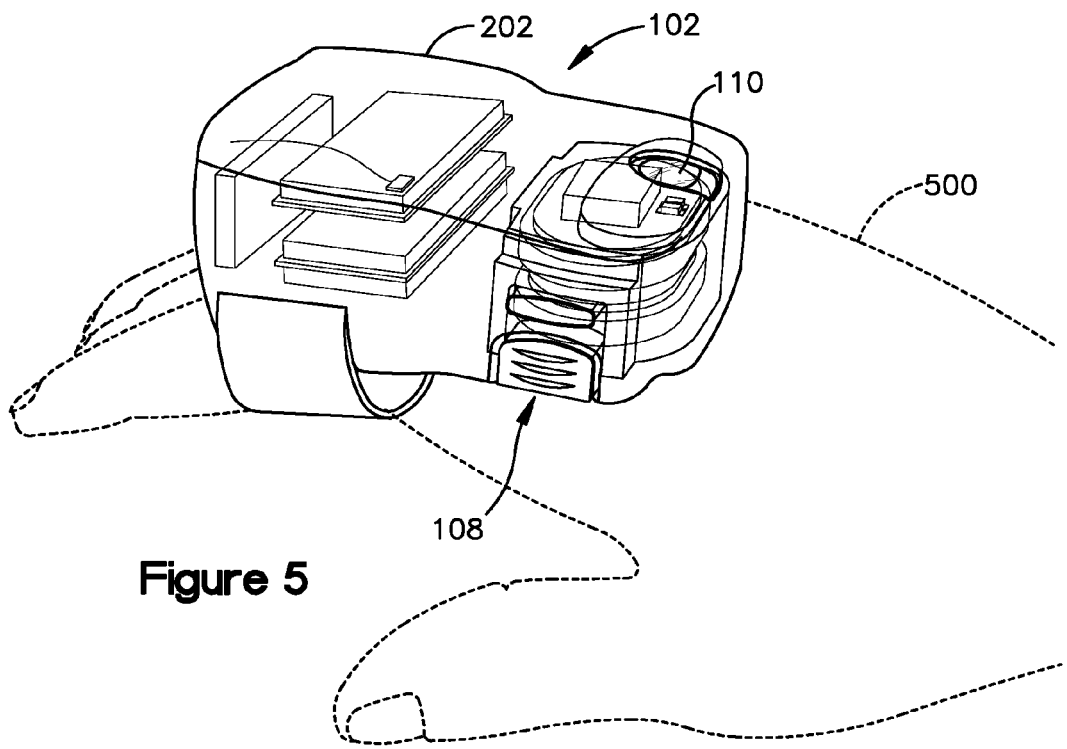
FIG. 5 illustrates an isometric of the scanner in an operational relationship on the hand of the user.

Referring now to FIG. 5, there is illustrated an isometric of the scanner 102 in an operational relationship on the hand 500 of the user. The battery pack 108 is situated in the rear of the scanner case 202 so that the user can more conveniently perceive the visual signals (through the view port 110) and audio signals when the scanner 102 is used on either hand.

Figure 6:
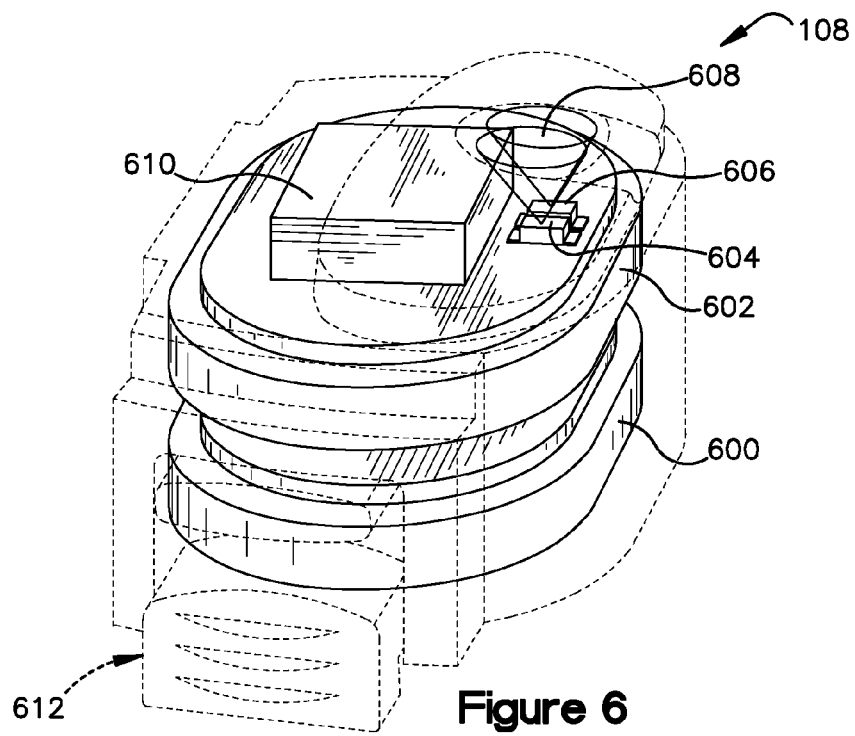
FIG. 6 illustrates a mechanical isometric of the battery pack.

Referring now to FIG. 6, there is illustrated a mechanical isometric of the battery pack 108. Contained within the pack housing 302 of the pack 108, in this particular embodiment, are two pancake battery cells (600 and 602) stacked according to the polarity required at the electrical interface. In this implementation, the cells (600 and 602) are NiMH cells. However, any suitable battery chemistry can be utilized. The pack 108 also includes a light source comprised of two LED elements positioned on top of the uppermost cell 602 in alignment with the view port 110, which elements include a green LED 604 and a red LED 606 for providing the corresponding light when controlled to do so in relationship to the scanning status. Positioned above the two LED sources (604 and 606) is a focal lens 608 having the one end that is viewable through the pack housing 302. The viewable end of the lens 608 has a convex curvature so that lens extends slightly above the housing surface. This facilitates visual feedback of the emitted light from most angles in which the hand may be oriented during use of the scanner 102 and battery pack 108. The pack 108 also includes an audio source 610 (e.g., a magnetic audio transducer) positioned in front of the LED sources (604 and 606) to emit the audio signal upwardly and rearwardly from inside the pack housing 302 while engaged in the scanner case 202, so that the user can perceive the audio signals. The pack housing 302 also includes a pair of slightly compressible thumb latches 612 (similar to latches 208) located on either end of the length for engaging the pack 108 into the scanner case 202. The pack cells (600 and 602), LEDs (604 and 606), and audio source 610 connect electrically to the interface connector 300 for powering the scanner electronics and receiving control signals therefrom.

Figure 7:
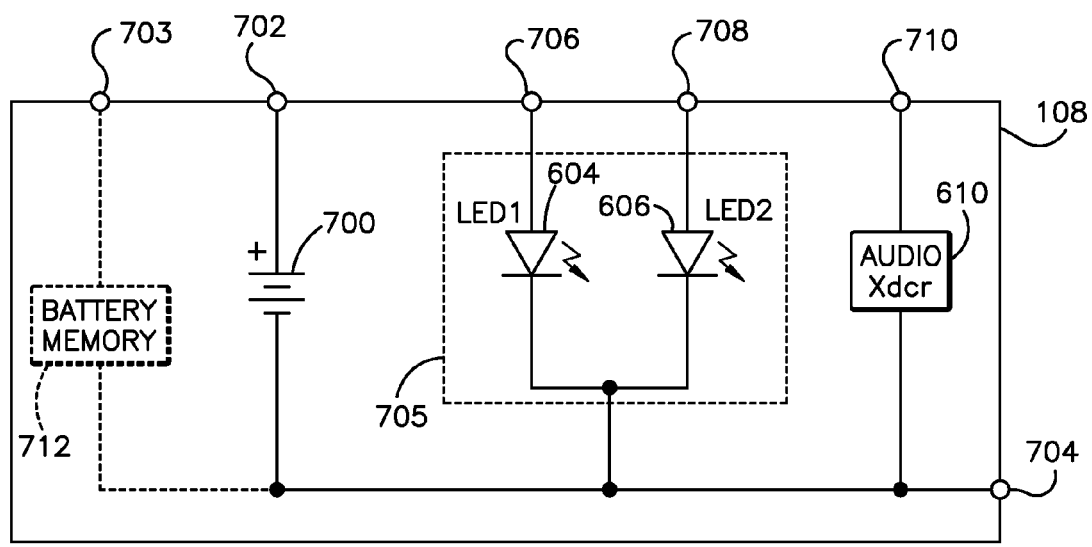
FIG. 7 illustrates a circuit diagram of the battery pack electronics.

Referring now to FIG. 7, there is illustrated a circuit diagram of the battery pack electronics. The pack 108 includes the battery power source 700 (consisting of cells 600 and 602) with the high and low sides connected to respective terminals (702 and 704) of the interface connector 300. A light source 705 includes the LEDs (604 and 606), each of which has its anode connected to respective connector terminals (706 and 708) and the cathodes tied at a common node, which common node is the low side terminal 704 of the power source 700. The audio transducer 610 has connects on one side to an input audio terminal 710 of the connector 300 and the low side terminal 704. Thus power is supplied from the pack 108 to the scanner electronics via the terminals 702 and 704; the LEDs are controlled on and off individually from a control circuit of the scanner electronics via respective terminals 706 and 708; and, the audio transducer 610 is controlled on and off (and different tonal frequencies) by the control circuit of the scanner electronics via respective terminals 710 and 704.

Optionally, a battery memory 712 may be incorporated into the battery pack 108 to retain data unique to the pack, and even the owner. The battery memory 712 is a non-volatile memory having a communication port 703 for receiving power and signals from a processor of the scanner 102, and for read/write of data back from/to the processor. The memory 712 also connects to the low side port 704. Stored data can include battery type, battery pack type, model number, manufacturer, characteristics, discharge rate, predicted remaining capacity, almost-discharged alarm so that the device processor can produce shutdown alerts to any combination of the LEDs and audio transducer to warn the user and shut down gracefully and, temperature and voltage to provide safe fast-charging.

Figure 8:
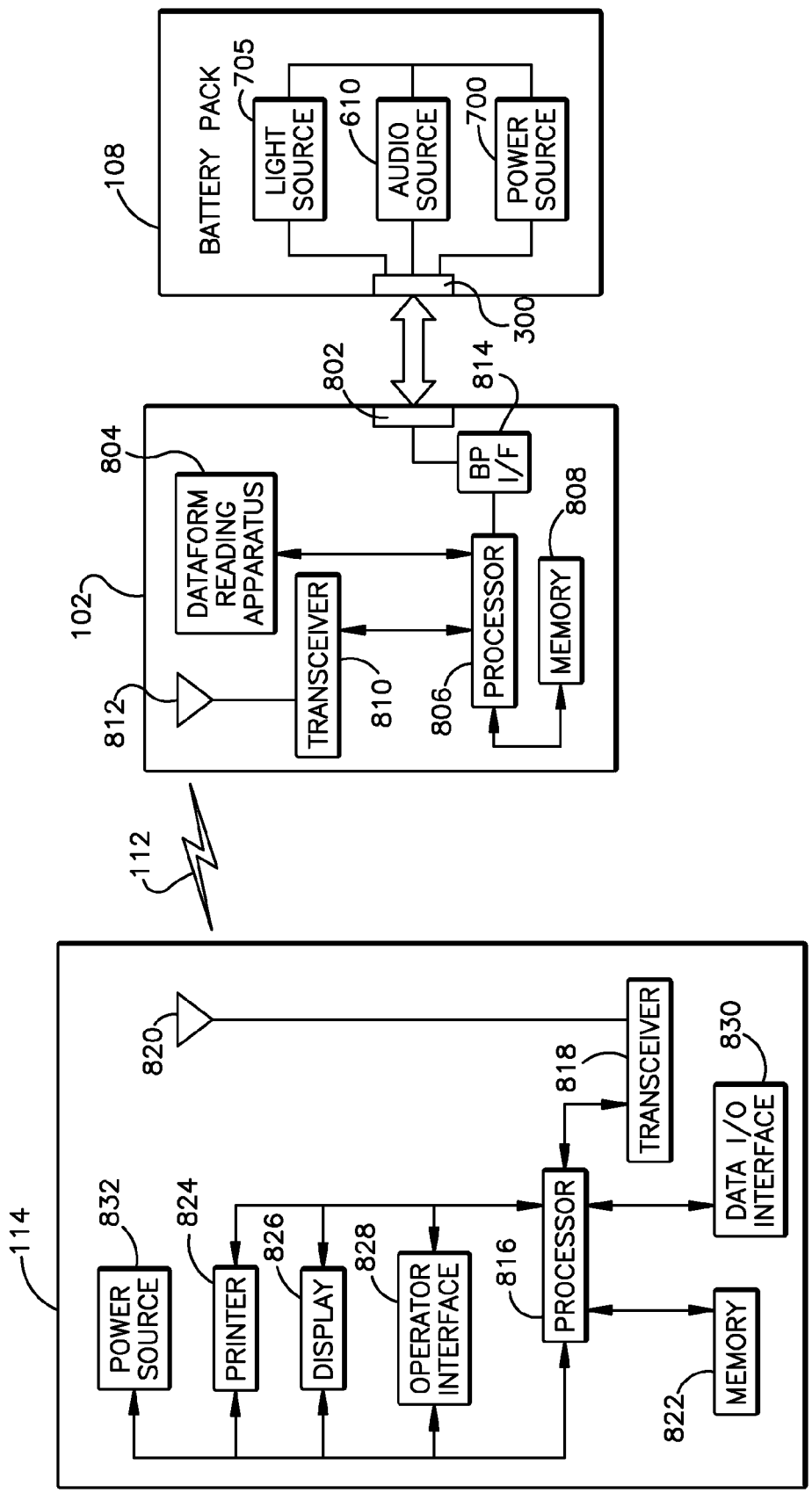
FIG. 8 illustrates a system block diagram of a portable data collection system.

Referring now to FIG. 8, there is illustrated a system block diagram of a portable data collection system 800. The system 800 comprises the scanner 102 in which the battery pack 108 is engaged, and the remote collection unit 114. The pack 108 includes the power source 700, audio source 610 and light source 705, all of which are operably interconnected with the scanner 102 to provide power thereto and receive control signals therefrom. The pack 108 interfaces to the scanner 102 via the interface connector 300 and a mating connector 802 of the scanner 102. Internal to the scanner 102 are the communication and control circuits implemented for operation of the scanner 102, and a reading apparatus 804 necessary for reading the dataform 106.

The dataform reading apparatus 804 may be any reading mechanism type utilized for reading data in a compatible format. For example, the reading apparatus may be a magnetic strip reader for reading a card or object containing a magnetically encoded strip dataform; a laser bar code scanner for reflecting a light beam from an encoded dataform to a image reading head; a card reader that receives a card with memory into a slot from which data can be read or input; a radio frequency (RF) system that transmits a pulse to card containing a passive transponder for reading the data contained therein (commonly found at toll gates, as the vehicle passes through the gate a transponder located within the vehicle is activated to read data unique to the owner), etc.

The communication and control circuits contained in the scanner 102 comprise a processor 806 for controlling all onboard functions of the scanner 102 and image analysis for decoding the target dataform 106. The processor 806 connects to the reading apparatus 804 to activate the readings functions and call the data therefrom. Connected to the processor 806 is a non-volatile memory 808 that serves to store the various programs and other data associated with the operation of the scanner 102. A communication transceiver 810 connects to the processor 806 for communicating data and signals between the scanner 102 and the remote collection unit 114. In this particular embodiment, the communication technology is RF. Thus an antenna 812 connects to the transceiver 110 to facilitate RF communication of signals and data wirelessly over the wireless link 112 established between the remote collection unit 114 and scanner 102. Note that other wireless communication technologies can be utilized between the scanner 102 and remote collection unit 114, e.g., infrared. Further, the system can be implemented in a wired regime such that the scanner 102 and remote collection unit are connected in wired communication.

The scanner 102 also includes a battery pack power interface block (denoted "BP I/F") 814 for providing regulated power to the scanner circuits of power received from the power source 700. The interface block 814 also accommodates control signals from the processor 806 to the light source 705 and audio source 610 of the pack 108 for activating elements of the light source 705 and the audio source 610. Of course, any of the illustrated communication and control circuit blocks could be combined into fewer blocks or a single block as is typically implemented in an ASIC (Application Specific Integrated Circuit). A person having ordinary skill in the art will be able to program such operations of the scanner 102 without undue effort. Hence, additional detail is not required.

The remote collection unit 114 includes circuits compatible for communicating both data and signals to the scanner 102. A unit processor 816 controls all onboard operations, and connects to a transceiver 818 for transmitting and receiving both signals and data of the scanner 102. In support thereof, this RF implementation includes a unit antenna 820 connected to the transceiver 818. A unit memory 822 connects to the processor 816 and serves to store the various programs and other data associated with the operation of the collection unit 114. A printer 824 can also be incorporated for providing a record output of data and other information from the collection unit 114. The processor 816 connects thereto to provide the information and control signals for operation of the printer 824.

A display 828 is provided in communication with the processor 816 to present data or other information relating to ordinary operation of the unit 114 to the user. For example, the display 828 may display a set of customer information, which is displayed to the operator and may be transmitted therefrom. Additionally, the display 828 may display a variety of functions that control the execution of the collection unit 114. The display 828 is capable of displaying both alphanumeric and graphical characters. The display 828 may be a liquid crystal display (LCD) or the like, so long as power consumption is relatively low. In more robust implementations, the display 826 is a touch display that facilitates user input. Otherwise, there is provided an operator interface 828 via which the operator enters input, e.g., a key pad, mouse pointer . . . . The collection unit 114 also includes a data I/O interface 830 via which data stored in the memory 822 can be downloaded and/or signals communicated to the processor 816. The data interface 830 can include conventional interfaces such as USB (Universal Serial Bus), IEEE 1394, RS-232, etc. All power for the collection unit 114 is provided by a unit power source 832, which would typically be batteries, since the unit 114 is worn on the operator. Power for the transceiver 818, memory 822 and data interface 830 can be provided through the processor 816, whereas the other circuits and peripherals can receive power directly from the power source 832. Such power distribution methodologies to onboard circuits and peripherals are commonly known by one skilled in the art. To conserve power, the collection unit 114 is operable to enter a minimum current draw of sleep mode when not in use.

Note that the processor 806 can be configured to control operation of the reading apparatus 804 while data and/or signals are being communicated between the remote collection unit 114 and the processor 806 from a previous read operation.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. For example, the pack 108 may also include or have included in lieu of the audio source 610, a vibratory source that operates in conjunction with the light source 705 such that upon a successful scan, a control signal from the processor 806 activates a vibratory element that communicates a vibration from the pack 108 to the hand (or fingers) of the user. This implementation may be suitable for a user who is hearing impaired. Furthermore, to the extent that the term "includes" is used in either the detailed description or the claims, such term is intended to be inclusive in a manner similar to the term "comprising " as "comprising " is interpreted when employed as a transitional word in a claim.

What is claimed is:

1. A battery pack with interface devices to a portable device, comprising:
    a battery pack housing comprising:
        a focal lens that includes a first end that comprises a view port;
        at least one power source internal to the battery pack housing;
        a first light source and at least a second light source internal to the battery pack housing and positioned above the at least one power source and in alignment with the view port to provide a light signal in response to a scanning status of said portable device, focal lens facilitates viewing of the light signal from a plurality of angles.

2. The battery pack of claim 1, the focal lens has a convex curvature that extends outward from the battery pack housing.

3. The battery pack of claim 1, the focal lens is positioned in proximity to the first light source and the second light source to focus the light signal external to the battery pack housing.

4. The battery pack of claim 1, the first light source is a first LED element and the second light source is a second LED element.

5. The battery pack of claim 1, the first light source illuminates a light of a first color and the second light source illuminates a light of a second color according to the scanning status.

6. The battery pack of claim 5, the focal lens focuses the illuminated light for external viewing of a distinctly colored light according to a respective scanning status.

7. The battery pack of claim 1, further comprising an audio source positioned internal to the battery pack housing that produces an audio signal that can be perceived external to the battery pack housing.

8. The battery pack of claim 1, further comprising a first compressible latch and at least a second compressible latch for engaging the battery pack housing into a scanner case.

9. The battery pack of claim 8, the first compressible latch is located on a first end of the scanner case and the second compressible latch is located on an opposite side of the scanner case.

10. The battery pack of claim 1 configured to be wearable on one or more fingers of a user.

11. A method of providing a battery pack with interface devices to a portable device, comprising:
providing a battery pack housing comprising:
at least one power source,
a focal lens that includes a view port viewable from a plurality of angles external to the battery pack housing; and
a first and a second light source positioned in alignment with the view port, the first and second light source provide at least one light signal in response to a scanning status of said portable device.

12. The method of claim 11, the battery pack detachably interfaces with the portable device.

13. The method of claim 11, the view port comprises a convex curvature that projects outward from the battery pack housing.

14. The method of claim 11, further comprising positioning an audio source in the battery pack housing so that an audio signal can be perceived external to the battery pack housing.

15. The method of claim 11, further comprising providing a first compressible latch and at least a second compressible latch for engaging the battery pack housing into a housing of a portable device.

16. The method of claim 11, further comprising locating the first compressible latch at a first end of the portable device housing and the second compressible latch at a second end of the portable device housing, the second end is diametrically opposed from the first end.

17. The method of claim 11, the first light source is an LED element of a first color and the second light source is an LED element of a second color, one of the first light source and the second light source illuminates depending on the scanning status.

18. The method of claim 17, the view port focuses the illuminated light for external viewing of one of the first color and the second color according to a respective scanning status.

19. A battery pack, comprising:
means for housing a battery pack that is detachably interfaced to a portable device;
means for supplying power to the battery pack;
means for producing a light signal according to a scanning status of the portable device;
means for focusing a light signal for perception of the light signal at a plurality of viewing angles external to the means for housing a battery pack; and
means for producing an audible signal in conjunction with the light signal according to the scanning status of the portable device.

20. The battery pack of claim 19, the means for focusing a light signal includes a concave curvature that projects from the means for housing the battery pack.

* * * * *